United States Patent
Bryant et al.

[11] Patent Number: 5,499,460
[45] Date of Patent: Mar. 19, 1996

[54] MOLDABLE FOAM INSOLE WITH REVERSIBLE ENHANCED THERMAL STORAGE PROPERTIES

[76] Inventors: Yvonne G. Bryant, 316 Lord Berkley Rd., Raleigh, N.C. 27610; David P. Colvin, Rte. 5, Box 67, Apex, N.C. 27502

[21] Appl. No.: 275,226

[22] Filed: Jul. 13, 1994

Related U.S. Application Data

[63] Continuation-in-part of Ser. No. 129,490, Sep. 30, 1993, abandoned, which is a continuation of Ser. No. 837,762, Feb. 18, 1992, abandoned.

[51] Int. Cl.$^6$ ............................ A43B 13/38; A43B 7/02; B32B 5/16/3/26
[52] U.S. Cl. ................... 36/43; 36/2.6; 428/283; 428/320.2
[58] Field of Search ............... 428/402, 402.21, 428/402.2, 317.9, 318.4, 304.4, 308.4, 313.3; 36/43, 44, 3 R, 3 B, 71, 2.5, 2.6

[56] References Cited

U.S. PATENT DOCUMENTS

| | | | |
|---|---|---|---|
| 4,055,699 | 10/1977 | Hsiung | 36/44 |
| 4,331,731 | 5/1982 | Seike et al. | 36/2.6 X |
| 4,513,518 | 4/1985 | Jalbert et al. | 36/44 |
| 4,524,529 | 6/1985 | Schaefer | 36/44 |
| 4,658,515 | 4/1987 | Oatman | 36/44 |
| 4,756,958 | 7/1988 | Bryant et al. | 428/320.2 |
| 5,366,801 | 11/1994 | Bryant et al. | 428/283 |

Primary Examiner—Paul T. Sewell
Assistant Examiner—BethAnne C. Cicconi
Attorney, Agent, or Firm—Rosenthal & Putterman

[57] ABSTRACT

A thermal barrier in the form of a base material with a plurality of microcapsules containing a phase change material forms an insulative pad, such as a shoe insole. The microcapsules are surroundingly encapsulated and embedded within the base material. In addition, substantially all of the microcapsules are spaced apart from each other, the space between neighboring adjacent microcapsules containing a phase change material. The microcapsules may be anisotropically distributed to further reduce thermal conductivity of heat through the thermal barrier.

14 Claims, 2 Drawing Sheets

MOLDABLE FOAM INSOLE WITH REVERSIBLE ENHANCED THERMAL STORAGE PROPERTIES

This application is a continuation-in-part of U.S. patent application Ser. No. 08/129,490 filed Sep. 30, 1993, now abandoned, which is a continuation application of U.S. patent application Ser. No. 07/837,762 filed Feb. 18, 1992, now abandoned.

FIELD OF THE INVENTION

This invention relates generally to the field of foamed insulation materials and more particularly to insulation materials for use in clothing, for example, shoe soles/insoles.

BACKGROUND OF THE INVENTION

The rate of a person's thermal exchange with the environment is dependent upon a number of factors, such as activity level, the nature and condition of the environment, and the characteristics of the clothing having contact with the wearer's skin. The transfer of body heat from the skin through clothing or footwear to the environment takes place by conduction, convection, radiation and evaporation, the physiological details and mechanisms of which are generally well known.

In footwear, conduction or convection from the foot through the shoe to the environment is the main mode of heat loss from the foot to the outer surface of a shoe or boot. Thermal energy is principally transferred by conduction through the footwear, and is thereafter transferred by conduction or convection as well as radiation from the sole to the environment.

Given the propensity for the extremities and particularly the feet to easily become cold, it is logical for efforts to have been made to improve the insulating capacity of shoe soles and/or insoles. U.S. Pat. No. 4,658,515 to Oatman entitled "Heat Insulating Insert For Footwear" discloses a heat retention insole for shoes comprising a laminated structure incorporating a flexible plastic bottom sheet, a similar plastic upper sheet, a space sheet formed primarily of a foamed organic plastic material. The spacer sheet includes large area apertures defined by bars extending transversely between portions of a parametrial band portion. These large area apertures are loosely filled with particles of insulating plastic materials (such as hollow polystyrene or polyethylene beads) which also serve to maintain the top and bottom sheets in a spaced relationship even when subjected to foot pressure. The outer surfaces of the insole are preferably provided with a heat reflecting coating or film to minimize the loss of heat from the foot by radiation and reflect any such radiated heat back in to the foot of the wearer. While somewhat effective, this insole relies on trapped air within cellular spaces to retard the flow of heat. Compression of the insulating material reduces the volume of the trapped air space which, in turn, increases thermal conductivity and increases the rate of heat loss through the footwear.

Another example of an insulating insole is disclosed in U.S. Pat. No. 4,055,699 to Hsiung which teaches a multilayer insole that is adapted for insertion into an article of footwear to insulate the foot from the cold developed in the sole and sock lining, from walking on a cold surface, the insole being thin enough to fit within the footwear without requiring an increase in footwear size. The insole comprises four layers, including from top to bottom, a top layer of soft fabric for comfortable contact with the plantar surface of the foot or sock of the wearer, a second layer of thermoplastic foam cushioning material, a third layer which is more effective than the remaining layers in insulating the foot against cold, and a fourth layer that is an aluminized polymeric material of paper thinness. Again, compression reduces efficacy.

Still another attempt at maintaining the warmth of the foot is found in U.S. Pat. No. 4,331,731 to Seike et al. which discloses an exothermic body for use as a shoe insole. The insole includes a foamed plastic sheet having cells therein and an exothermic agent such as a mixture of iron, saline solution, activated carbon and woodmeal or pulp powder. The foamed sheet is covered by an air-permeable, thin film such as a thick perforated plastic film. A cushion material is provided on at least one surface of the foamed plastic sheet covered with the air-permeable thin film and the foamed plastic sheet together with the cushion material covered by an air permeable film cover. This device is not rechargeable and is, therefore, an expensive and temporary solution to the problem.

It is, therefore, an object of the present invention to provide a shoe insole having enhanced ability to insulate the foot from hot or cold.

Another object of the present invention is to provide a shoe insole that is compatible with existing footwear and which may be used without the necessity of the user purchasing footwear larger than that normally worn.

Yet another object of the present invention is to provide a shoe insole with enhanced insulating properties that also has a high degree of structural integrity.

A still further object of the present invention is to provide a shoe insole having enhanced thermal storage properties that is reusable.

A related object of the present invention is to provide a shoe insole with limited compressibility and which, therefore, enhances thermal management of the foot.

SUMMARY OF THE INVENTION

In accordance with the present invention, there is provided, an insole adapted to be removably positioned within an article of footwear to insulate the foot from heat or cold and provide auxiliary heat from stored energy. The insole comprises a flexible resilient base material forming a pad. A plurality of microcapsules are integral with and dispersed throughout at least a portion of the base material and contain a temperature stabilizing means, such as a phase change material, for example, paraffinic hydrocarbons. The microcapsules are individually surroundingly encapsulated and embedded within the base material. Substantially all of the microcapsules are spaced apart from each other and the space between neighboring adjacent microcapsules is base material. Furthermore, the insole may include an anisotropic distribution of particles such that they are concentrated closer to the plantar region of the foot. Alternatively, the insole may be multilayered, with the upper layer containing microcapsules and the lower layer a microcapsule free insulator.

BRIEF DESCRIPTION OF THE DRAWINGS

Some of the objects of the invention having been stated, other objects will appear as the description proceeds when taken in connection with the accompanying drawings in which.

DETAILED DESCRIPTION OF THE PREFERRED EMBODIMENTS

While the present invention will be described more fully hereinafter, it is to be understood at the outset that persons of skill in the art may modify the invention herein described while still achieving the favorable results of this invention. Accordingly, the description which follows is to be understood as being a broad teaching disclosure directed to persons of skill in the appropriate arts, and not as limiting upon the present invention.

The insole generally indicated at 10 is adapted to be removably positioned within an article of footwear (not shown) to insulate the foot from heat or cold and comprises a flexible resilient base material forming a pad. A plurality of leak resistant microcapsules 20 (indicated by the dark dots in FIGS. 3 & 4) are integral and dispersed throughout the base material. The microcapsules 20 are individually surroundingly encapsulated and embedded within the base material. In addition, substantially all of the microcapsules 20 are spaced apart from each other, the space between neighboring adjacent microcapsules being base material. The microcapsules contain a temperature stabilizing means 30.

Figure 1:
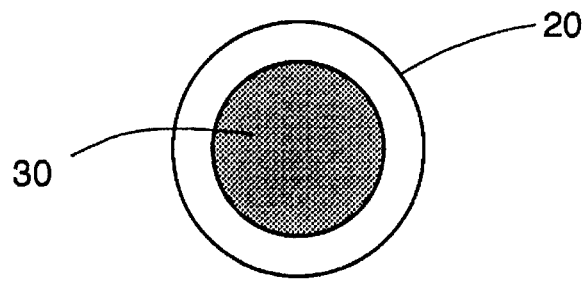
FIG. 1 is a cross section of a microcapsule according to the present invention containing a phase change material.
Figure 2:
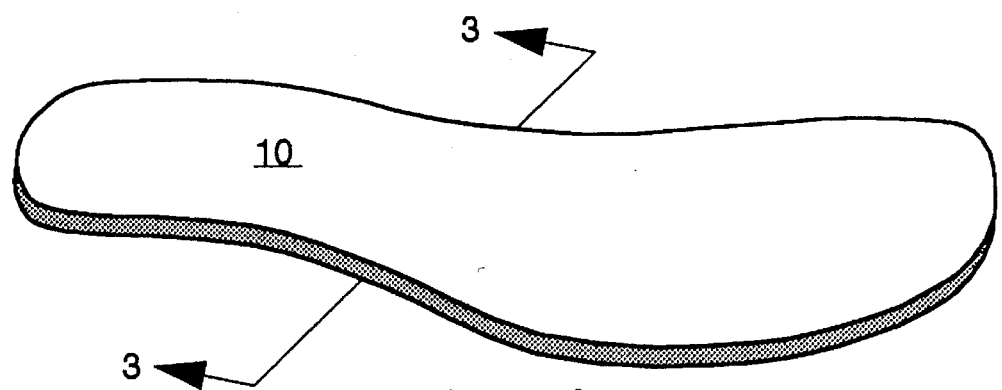
FIG. 2 is a perspective view of an insole according to the present invention.
Figure 3:
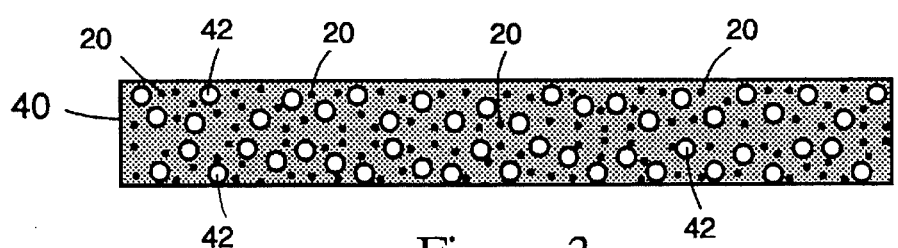
FIG. 3 is a sectional view of an insole according to the present invention taken along line 3—3 of FIG. 2 wherein microcapsules are embedded within a foam.
Figure 4:
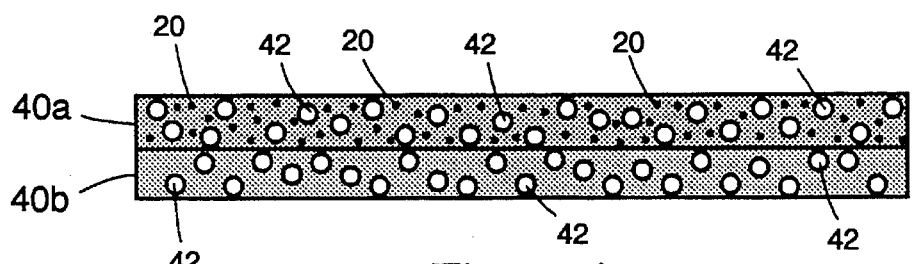
FIG. 4 is a sectional view taken along line 3—3 of FIG. 2 of a second embodiment of the insole according to the present invention wherein microcapsules are anisotropically embedded within a foam comprised of two layers.
Figure 5:
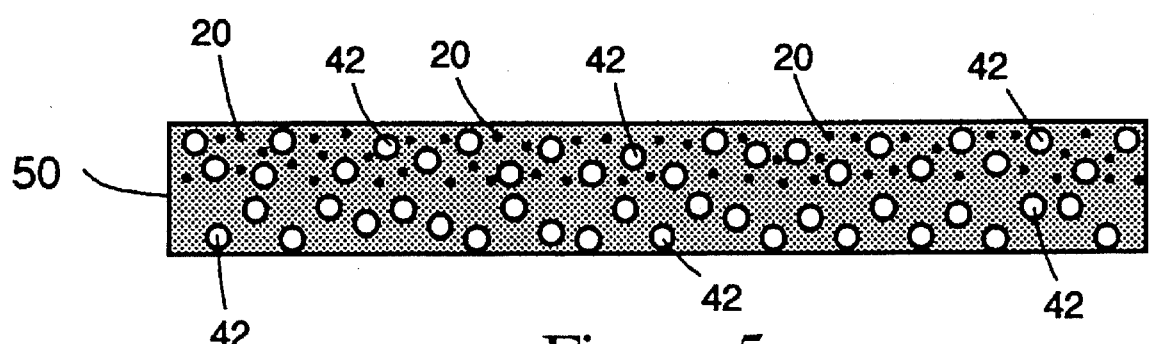
FIG. 5 is a sectional view taken along line 3—3 of FIG. 2 of a third embodiment of the insole according to the present invention wherein microcapsules are anisotripically embedded within a single layer foam.

The base material forming the pad is a polymeric material such as a moldable foamed organic plastic 40. The air cells 42 are schematically illustrated in FIGS. 3 & 4 as the circular white dots. Exemplary of acceptable polymers employed in the footwear industry are polyurethane, ethylene/vinyl acetate (EVA) copolymer, latex, polyethylene, polypropylene, butyl, silicone, cellulose acetate, neoprene, epoxy, polystyrene, phenolic, and polyvinyl chloride (PVC). The foregoing may be foamed or not, depending on the particular material selected. The foam may also be closed cell or open cell, again depending on the particular application.

The microcapsules 20 can range in size from about 1.0 to about 1000.0 microns and are formed according to conventional methods well known to those skilled in the art.

The microcapsules contain a temperature stabilizing means or phase change material 30 such as eicosane. Additionally, plastic crystals such as 2,2-dimethyl-1,3-propanediol (DMP) and 2-hydroxymethyl- 2-methyl-1,3-propanediol (HMP) and the like may be used as the temperature stabilizing means. When plastic crystals absorb thermal energy, the molecular structure is temporarily modified without changing the phase of the material. For high temperature applications low melting point eutectic metals such as low melting point solders may be employed.

In another aspect of the invention, the composition of the properties for a given temperature range. For example, the melting point of a homologous series of paraffinic hydrocarbons is directly related to the number of carbon atoms as shown in the following table:

| Compound Name | Number of Carbon Atoms | Melting Point Degrees Centigrade |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Each of the above materials can be separately encapsulated and is most effective near the melting point indicated. It will be seen from the foregoing that the effective temperature range of the insole can, therefore, be tailored to a specific environment by selecting the phase change materials required for the corresponding temperature and adding microcapsules containing the material to the insole.

In addition, the insole 10 can be designed to have enhanced thermal characteristics over a wide range of temperature or at discrete temperature ranges through proper selection of phase change material.

In fabricating the insole 10, the desired encapsulated phase change materials are added to the base polymer (liquid or solution) and fabrication is accomplished according to conventional methods which may include foaming. Typical concentrations of microencapsulated phase change particles added to the base polymer material range from about 20% to about 60% by weight. The foregoing concentrations are believed to allow the insole to be subjected to the repeated mechanical stresses of ambulation with minimum changes in the thermal characteristics of the insole. During fabrication, a base material is formed by selecting a liquid polymer and/or elastomer and then causing the foregoing to be foamed. Common methods of foaming include adding a hardening agent which causes a chemical reaction, thermally setting the base material with heat, or bubbling a gas through the liquid polymer/elastomer while hardening, or other methods well known to those skilled in the art. The microcapsules would be added to the liquid polymer/elastomer prior to hardening and mixed therein to ensure wetting and equal dispersion throughout the mixture. After mixing, the microcapsules will be wetted and substantially all will be spaced apart from each other. Thus, when the base material is foamed by the methods described above, the microcapsules will be embedded within a base material matrix so that they are individually surroundingly encapsulated and embedded within the base material and further, the space between neighboring adjacent microcapsules will be base material and not the foaming gas. It is believed that the wetting step coats the microcapsules and that the surface tension of the polymer/elastomer maintains the coating around the microcapsules during and after foaming. In addition, the surface tension of the foamed bubble prevents the PCM particles from crossing the boundary into the bubble. Thus, the gas pockets formed during foaming are substantially free of microcapsules.

It will be noted that the microcapsules embedded within a foam as described above are actually surrounded by two distinct walls. The first being the microcapsule wall itself and the second being the wall formed by the foam. Thus, the propensity for the phase change material to leak out of the insole is substantially reduced. The net result is repeatability of thermal response when the insole is re-used.

In the fabrication of the invention, the microcapsules 20 need not be evenly distributed throughout the entire insole. For example, the microcapsules 20 may be anisotropically distributed so as to concentrate them in the upper portion of the insole in a plane substantially parallel to the underside of the plantar region of the foot. It is believed that the loading or concentration of the particles in the insole would decrease from an initially selected concentration (top being nearest the foot) by one- half as one moves by quartiles away from the top as follows:

| | |
|---|---|
| First quarter of insole | 100% (top) |
| Second quarter of insole | 50% |
| Third quarter of insole | 25% |
| Fourth quarter of insole | 0% (bottom) |

Similarly, the insole may be fabricated in two or more layers 40a,40b as shown in FIG. 4, only one of which contains microcapsules. These layers- are then bonded together using conventional methods with the net result being a concentration of microcapsules 20 proximate the foot embedded in the base material. The various layers 40a,40b may be of the same or different materials, depending on the particular application. Alternatively, both layers may contain microcapsules to form an additional thermal barrier.

It will be appreciated that the insole according to the invention will have enhanced value if produced to have application in heat as well as cold. For example, the insole 10 could be inserted into footwear which would be cold during winter and hot during summer. Furthermore, a single phase change material can be employed to both heat and cool a shoe. For example, an insole having a PCM selected to melt at higher temperatures can be thermally charged simply by being present in a room proximate a heat source. Thereafter, when in use in a cold environment such as ice or snow, the foot of the user will remain warm for an extended period of time and will protect the foot of the wearer for a substantial period of time beyond that of standard non-PCM containing footwear until the phase change material solidifies. Similarly, in summer, when the same insole is stored in a relatively cool environment, such as within a home or office and is then used, for example, on a hot asphalt roadway, the foot will remain cool until the phase change material melts. A preferred method would be to pre-cool the insole in a conventional refrigerator. Additionally, the insole could be fabricated with microcapsules containing two discrete types of phase change material, one suitable for assisting maintaining the foot of the wearer at each of two desired temperatures.

The insole may be used as a thermal storage device, somewhat similar to a battery. In operation, the user may preheat (or precool) the insole prior to insertion within the article of footwear. Alternatively, the preheating or pre-cooling as the case may be, may be accomplished simply by returning inside after having been out of doors (for example, in the snow when the microcapsules will be recharged from the warmer air present inside, i.e., near a fireplace or other heat source, or recharged for re-use by metabolic heat production during high activity levels).

While the foregoing description makes reference to a shoe insole, the reader will note that the present invention has wide application not only in other areas of the shoe but in many related items of clothing or padding. The present invention contemplates fabrication of the shoe sole from a foam pad produced according to conventional means. Therefore, one method of producing the insoles is in the form of a large flat sheet. The sheet then passes through a punch press which cuts out individual insoles. The reader will note that the sheet may be used as linings in gloves, hats, outerwear, and underwear and the present invention may, therefore, be regarded generally as a thermal barrier.

In addition to the uses specified above, the reader will appreciate that the thermal barrier could have additional uses in its sheet form. For example, certain products such as pharmaceuticals must be maintained at or below maximum temperatures. This is often a difficult undertaking when transportation is required. Therefore, the present invention will find application as a thermal "blanket". The blanket is charged by freezing the phase change materials within the microcapsules and may then be wrapped around the product to maintain the temperature thereof.

The foregoing embodiments and examples are to be considered illustrative, rather than restrictive of the invention, and those modifications which come within the meaning and range of equivalence of the claims are to be included therein.

That which is claimed is:

1. An insole having thermal energy storage and insulative properties adapted to be positioned within an article of footwear to protect the foot and comprising:

a flexible resilient base material forming an insulative pad, a plurality of microcapsules integral with and dispersed throughout at least a longitudinal section of said pad, and wherein said microcapsules are individually surroundingly encapsulated and embedded within said base material, and further wherein substantially all of said microcapsules are spaced apart from each other, the space between neighboring adjacent microcapsules comprising base material, said microcapsules containing a temperature stabilizing means;

whereby the insole exhibits enhanced thermal stability and thermal insulation properties.

2. The insole according to claim 1 wherein said microcapsules are leak resistant, whereby the insole may be subjected to the repeated external stresses of ambulation with minimum changes in the thermal capacitance and insulation properties of the insole.

3. An insole according to claim 1 wherein said temperature stabilizing means comprises a phase change material.

4. An insole according to claim 1 wherein said temperature stabilizing means comprises a material selected from the group of paraffinic hydrocarbons consisting of n-Octacosane, n-Heptacosane, n-Hexacosane, n-Pentacosane, n-Tetracosane, n-Tricosane, n-Docosane, n-Heneicosane, n-Eicosane, n-Nonadecane, n-Octadecane, n-Heptadecane, n-Hexadecane, n-Pentadecane, n-Tetradecane, and n-Tridecane.

5. An insole according to claim 1 wherein said microcapsules range in diameter from about 1.0 micron to about 1000 microns.

6. An insole according to claim 1 wherein a portion of said microcapsules contain a first temperature stabilizing means for maintaining the warmth of the foot and others of said microcapsules contain a second temperature stabilizing means for cooling of the foot.

7. An insole according to claim 5 wherein said microcapsules are anisotropically distributed within said insole.

8. An insole according to claim 7 with enhanced thermal storage properties wherein said anisotropic distribution concentrates said microcapsules in the upper portion of said insole and in a plane substantially parallel to the underside of the plantar portion of the foot and further wherein said insole may be thermally recharged for re-use.

9. An insole according to claim 1 wherein said base material is a polymer.

10. An insole according to claim 9 wherein said polymer is a moldable foam.

11. An insole according to claim 10 wherein said foam is open-cell.

12. An insole according to claim 10 wherein said foam is closed-cell.

13. A method of protecting the foot from the deleterious effects of prolonged exposure to cold and comprising the steps of:

(a) thermally charging a flexible resilient insole of the type having a base material forming an insulative pad and a plurality of microcapsules containing a phase change material dispersed throughout at least a longitudinal section of the pad, and wherein the microcapsules are individually surroundingly encapsulated and embedded within the base material, and further wherein substantially all of said microcapsules are spaced apart from each other, the space between neighboring adjacent microcapsules comprising base material, to a temperature where the phase change material melts;

(b) inserting the thermally charged insole into an article of footwear immediately prior to use, whereby the insole forms an additional barrier between the foot and the external environment.

14. The method according to claim 13 wherein the microcapsules are anisotropically distributed so that they are concentrated in the upper portion of the insole in a plane substantially parallel to the plantar portion of the foot.

* * * * *